United States Patent [19]

Sitarski

[11] Patent Number: 5,237,497

[45] Date of Patent: Aug. 17, 1993

[54] METHOD AND SYSTEM FOR PLANNING AND DYNAMICALLY MANAGING FLOW PROCESSES

[75] Inventor: Edward M. Sitarski, Toronto, Canada

[73] Assignee: Numetrix Laboratories Limited, Toronto, Canada

[21] Appl. No.: 673,294

[22] Filed: Mar. 22, 1991

[51] Int. Cl.$^5$ .................... G06F 15/20; G06G 7/48
[52] U.S. Cl. .................................... 364/402
[58] Field of Search ............... 364/402; 379/16, 34, 379/96, 122, 136, 221

[56] References Cited

U.S. PATENT DOCUMENTS

| | | | |
|---|---|---|---|
| 4,924,386 | 5/1990 | Freedman et al. | 364/402 |
| 4,937,743 | 6/1990 | Rassman et al. | 364/401 |
| 4,991,204 | 2/1991 | Yamamoto et al. | 379/221 |

Primary Examiner—Roy N. Envall, Jr.
Assistant Examiner—Ari M. Bai
Attorney, Agent, or Firm—Kramer, Brufsky & Cifelli

[57] ABSTRACT

A method for prospective planning and dynamic management of a flow processes comprising a plurality of interrelated and interdependant processes, resources and commodity flows using a computer system. The method includes providing a database containing information about the flow process and graphically displaying both the problem and the solution spatially and/or temporally. Indicia can be made to appear on the display to provide visual identification of symbols as well information about the solution, capacity, minimum levels, flows and variances. In addition, access to the data base can be made available either to update the display to reflect current information or to perform "what-if" scenarios. Access to the database is through objects displayed and permits a wide variety of information to be queried and displayed. The system also has the capability to communicate portions or all of the plan to other modules and to receive data from other modules.

39 Claims, 12 Drawing Sheets

Local System, Compressed, Blocked, DentonPD Arcs Only

FIG. 1

Local System, Uncompressed, Unblocked

FIG. 1A

Local System, Uncompressed, Blocked

FIG. 1B

Local System, Compressed, Blocked, DentonPD Arcs Only

FIG. 2

Complete System, Uncompressed, Blocked

FIG. 2A

Complete System, Compressed, Blocked

FIG. 3

Complete System, Compressed, Blocked, Used Arcs Only

FIG. 4

Complete System, Compressed, Blocked, Used Arcs, Fat Arcs

FIG. 5

Complete System, Arcs to DentonPD Showing

FIG. 6

Complete System, Arcs to DentonPD Showing

FIG. 6A

Complete System, Arcs from DentonPD Showing

FIG. 7

Local System, Nodes and Arc Tables Showing

FIG. 8

Local System, Pop Up Tables Showing

METHOD AND SYSTEM FOR PLANNING AND DYNAMICALLY MANAGING FLOW PROCESSES

FIELD OF INVENTION

The present invention relates to a method for managing flow processes and more particularly to a method for prospective planning and dynamic management of flow processes which comprise a plurality of interdependent and interrelated processes, resources and commodity flows using a computer system for communicating information.

BACKGROUND OF THE INVENTION

Many different fields require the management of flow processes to execute programs and plans effectively and efficiently while matching competing demands for limited resources. A hydroelectric power firm, for example, needs to manage generating capacity in concert with water supply and water storage capabilities to meet electrical demand over multiple time periods. In addition, this firm may be also connected to a grid to which it can sell power or buy power; thus, shared resources and/or flows may be involved. It also involves the process of replanning the flow and use of resources as time passes and events occur, often not in accordance with the original plan; such as in this example, lower rainfall diminishes water supply and higher temperatures could increase electrical demand.

Likewise, the effective and efficient management of a manufacturing firm's flow of materials from suppliers through plants and a distribution network to customers requires coordinating numerous different flows of materials; resources such as suppliers, machines, personnel, transportation, and customers; processing activities; and usually, necessitates collecting, accessing, and utilizing information derived from many different sources.

Manufacturing planners for multiple time periods which employ computers are well known. Such planners focus on a segment of the flow process such as planning the flow or production through one plant or facility over-looking interdependency or interrelationships, and the finite capacity of resources and flows. Others have focused on solely the flows in the distribution network; again, without regard to capacities and/or integrating the flow processes of the firm.

Others have attempted utilizing spread sheets programs and have been limited by the complexity of the number of flows, resources, and processes that can be employed along with the result that a non-optimal solution is produced. Some have attempted linear programming or variations on the technique to develop plans. Planners are not well equipped to operate and interpret the results, and have found these tools cumbersome to use.

The management of flow processes, which can change in time, have complex interrelationships and interdependencies including constraints which can present serious problems to effective planning of flow processes. Inefficient and incompatible solutions to these problems can result in having higher cost, poor utilization, and ineffective customer service in a manufacturing setting. Visualization of the solution and the complex interrelationships and interdependencies is most important.

What is needed is an effective display of the flow processes as a function of the associated spatial and temporal aspects with a data base of information relating to the flow processes including resources, processing activities, and commodity flows. In addition, such a system should be able to display aggregate information to reduce the complexity of the display. It should also have the capability to display user defined sets of the flow processes and view them or to create various sets and manipulate the sets to generate new displays. It should also have the ability to perform ad hoc displays.

The system should allow information to be imported into the database to build the flow processes components of resources, processes and commodities; or to be built from the display by creating icons representing resources and processes and connecting them through commodity flows or lines.

The method and systems should also provide an optimal solution to the prospective planning problem and the ability to visualize various aspects of the prospective plan over multiple time periods as the plan is updated.

In addition, such a system, most advantageously, would make use of windows to display additional information beyond that which cannot conveniently be placed on a graphical display.

In U.S. Pat. No. 4,937,743 there is disclosed a method for the prospective scheduling, periodic monitoring and dynamic management of a plurality of interrelated and interdependent resources using a computer system. The method includes providing a data base containing information about the resource and graphically displaying utilization and availability of the resources as a function of time. Indicia can be made to appear on the display to provide visual identification of symbols as well as information about scheduling, status and conflicts involving the resources. In addition, access to the data base can be made available to provide a continuous update of the display so that the display of the resources is for the most recent data in the data base. Access to the data base can also permit the operator to call up a wide variety of information about the resource and can also be used to track events and procedures. The method does not involve the use of spatial displays and does not pertain to scheduling or planning any manufacturing operation in which the resources transform a material or consist of a series of transformations called processes and which involves the flow or movement of materials.

In U.S. Pat. No. 4,336,589 there is disclosed a warehouse product monitoring and control system which includes a distribution audit system computer which receives batch picking information on a recording medium identifying each transaction or article to be picked with a unique number. Associated with each unique number is processing information for controlling the sorting of the article within the system. The same number, unique for each article, is contained on a label positioned on each article as it is picked. The computer control provides continuous monitoring of the article as it is scanned by one or more label reading devices such that the picking and sorting status of each article to be picked can be continuously monitored. The system includes operator interface terminals and printers for providing a variety of status reports to the operating personnel such that the operational status of the system can be continuously monitored.

SUMMARY OF THE INVENTION

The invention relates to a method for the dynamic management of flow processes which comprise a plurality of processes, resources, and commodity flows using a computer system for single or multiple time phases. The method includes providing a database that contains information about the flow processes to be managed including processes, resources, and commodity flows, and graphically displaying the anticipated or actual flow processes to be managed spatially and/or temporally, e.g. time phases or periods.

Generally, the displays can be in the form of lines, bars and arcs connecting rectangles, circles and geometric figures or other types of icons. The invention also incorporates the ability to generate on the display various types of icons or objects representing processes, resources, and commodity flows, and to enter information about the object's variables and constraints onto the database from screen tables, or import the data from other sources. Uniquely, the invention's objects serve as both input representation of the problem and output solution or prospective plan; yielding a common visual representation.

A feature of the system is visual/sensory indicators. "Solution Indicia" may be used to indicate the processes, resources and flows employed by the prospective plan. "Capacity Indicia" may be used to reflect resources and/or flows at capacity, and "Minimal Indicia" may be employed to alert operators that minimum resource levels or flows have not been met. Other indicators such as "Path Indicia" may be used to show the paths to and from locations.

Also, the method and system of this invention gives access to the database in order to display information about selected objects. Sets of objects can be defined or blocked and display tools are provided to manipulate sets by known Boolean operators defining new sets for display or data access.

Further, the invention contemplates the use of known optimizing solver(s) as well as notification to other planning, scheduling and/or execution modules; solution information about assignments, allocations, levels, utilization, velocities and other information about processes, and commodity flows.

The system can also embody variance analysis means whereby it can determine how much the plan is deviating from expected, previous, actual or other basis and use visual sensory indicators or "Variance Indicia" for those that exceed predefined levels.

Not every application of this invention will necessarily incorporate all the invention's features. Some applications will need some of the features, while more sophisticated or more complex applications will utilize more of the features contemplated by the instant invention.

DETAILED DESCRIPTION OF THE INVENTION

The method according to the invention enables the planning of complex flow processes which comprise a plurality of processes, resources and commodity flows which are interrelated and interdependent and can vary in time. Preferably, the method utilizes a display system such as the type associated with a workstation or personal computer or client/server configuration and a keyboard and a mouse for selectively changing the display. Such a display is referred to as a transient optical display, and exemplary hard copies of displays generated by such a transient optical display are illustrated in FIGS. 1 through 8. In addition, a database containing data relating to processes, resources and commodity flows can be accessed. The database preferably comprises a semi-permanent database and/or a transitory database. The database can be updated from one or more sources and this, in turn, can result in an update of the information being displayed. The keyboard can also be utilized to input data to the database and to initiate solving for a prospective plan. The data is preferably displayed graphically as a function of location utilizing maps, diagrams, layouts or other exhibits to portray the flow relationships, e.g., the spatial relationship between various resources, processes and commodity flows or, the data could be displayed graphically as a function of time periods to portray the temporal relationships amongst various processes, resources or commodity flows.

Inputting, modifying, handling and accessing of the data can be accomplished by defining the processes, resources and commodities as objects and using known methods and techniques. Similarly, generating appropriate graphical displays can be done using well-known techniques. Most advantageously, the method would employ the use of a mouse and windows with a menu driven system consisting of menus and submenus.

There are many situations which can be effectively managed by the use of the instant invention. One such application is the operational planning for a manufacturer/distributor over multiple time periods for the movement of commodities from suppliers through manufacturing and distribution facilities to customers. The movement can be represented as a network of objects consisting of nodes, arcs, and commodities, with commodities flowing on arcs from and to nodes. The nodes can represent resources such as supply nodes, used to source a commodity; a machines node, used to represent a time resource of a piece of equipment; a labor node, used to provide a labor resource time; and a demand node, which depletes or consumes commodities. Other nodes are process nodes for activities which convert commodity(s) into other commodity(s); working storage nodes utilized to direct arcs carrying the same commodity through an intermediate storage; and controller nodes which might represent a warehouse, e.g., which is used to set constraints across multicommodity flow. In addition, block nodes are used to visually encapsulate complex parts of the model. Block nodes also can be used to place single sourcing constraints and to color maps.

"Single Sourcing" as used herein refers to constraining the block node to utilize a single arc only for each commodity sourced.

Arcs can represent various transportation modes such as truck, rail, conveyor, pipelines or paths available between two points on which commodities or materials flow. Each object, either a node or an arc, represents variables and constraints to the planning problem and information can be provided in the database about each object. For example, a supplier can provide a material at a certain cost as long as the quantity is in the range of some minimum and maximum. Another supplier may have only a fixed quantity available for each time period. Process activities may run only on a certain piece of equipment and that equipment may not be available at various periods because of construction, plant shut down for vacation or major maintenance. Process yields may vary by time as a learning curve increases. Demand for products could be seasonal, thus varying in time. Preferably, all such information would be included in the database.

The database, also, would include standard information about known processes or activities. For example, it may include information like: making product A from material B consumes 35 lbs of B to make 160 cases of A, and requires 1 hour on packaging machine 2, and operator J and K are the only skilled people trained to operate packaging machine 2, and their availability must be considered.

The primary database can also be employed to store information about the solution to the planning problem. If values in the planned solution are in variance with previous established levels, various indicators are displayed. The planned solution can be monitored and displayed by the use of indicia. Indicia such as "Solution Indicia", "Capacity Indicia", "Miminal Indicia", "Flow Indicia", and "Variance Indicia". Any of the several indicia can be displayed in a myriad of ways, including color changes, color bars, shading, alphanumerics and the like, and combinations thereof. The several indicia can also be displayed by the use of highlighting, geometric symbols, hashing, and/or enhancement, such as brightened form around data.

The operator of the system can "select" certain node(s) and arc(s) for display and also change the variable(s) and constraint(s) for the selected node(s) and arc(s) from screen tables.

In using the system of the instant invention, the operator collects information from various sources concerning the flow processes. In the context of a manufacturer/distributor, this might involve information related to customer demand, inventories at various stages of manufacturing and distribution, processing rates, machine and labor availability and supplier and transportation capabilities with costs and constraints associated with these processes and resources. Other information may be also supplied, such as warehouse capacities.

The operator loads this information in the database in any conventional manner and then proceeds to plan the flow processes utilizing a solver. As is recognized by those skilled in the art, the solver may be a linear program, a rule-based program, or a combination of the two. If an attempt is made to utilize any incompatable data such as a minimum greater than a maximum, the operator would be alerted. Having thus been alerted, the operator would then revise the data before proceeding. After any revisions, a display of the flow process subset, such as in FIG. 1, would result.

Figure 1:
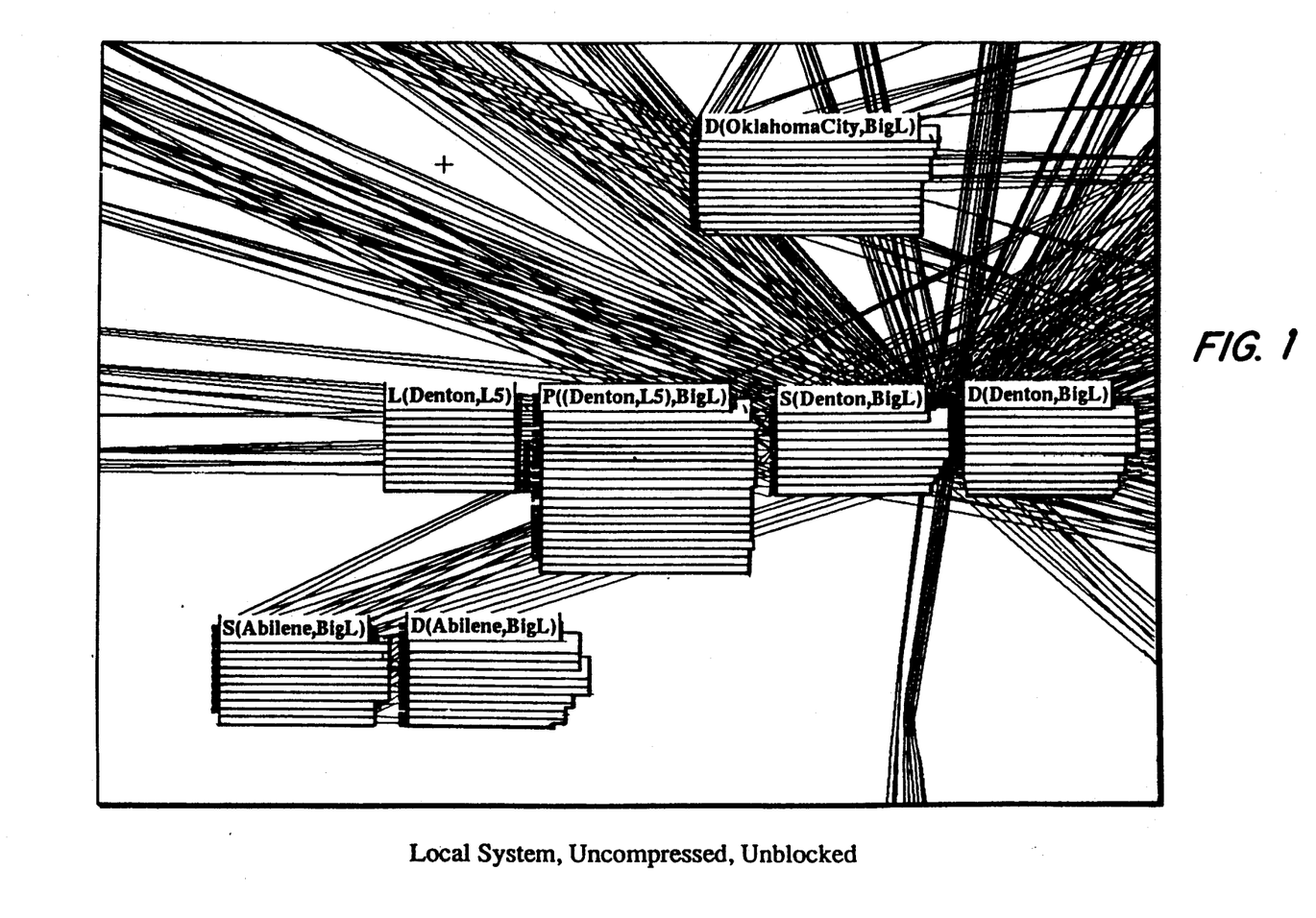
FIG. 1 shows a display of a flow processes subset in accordance with the invention.
Figure 1A:
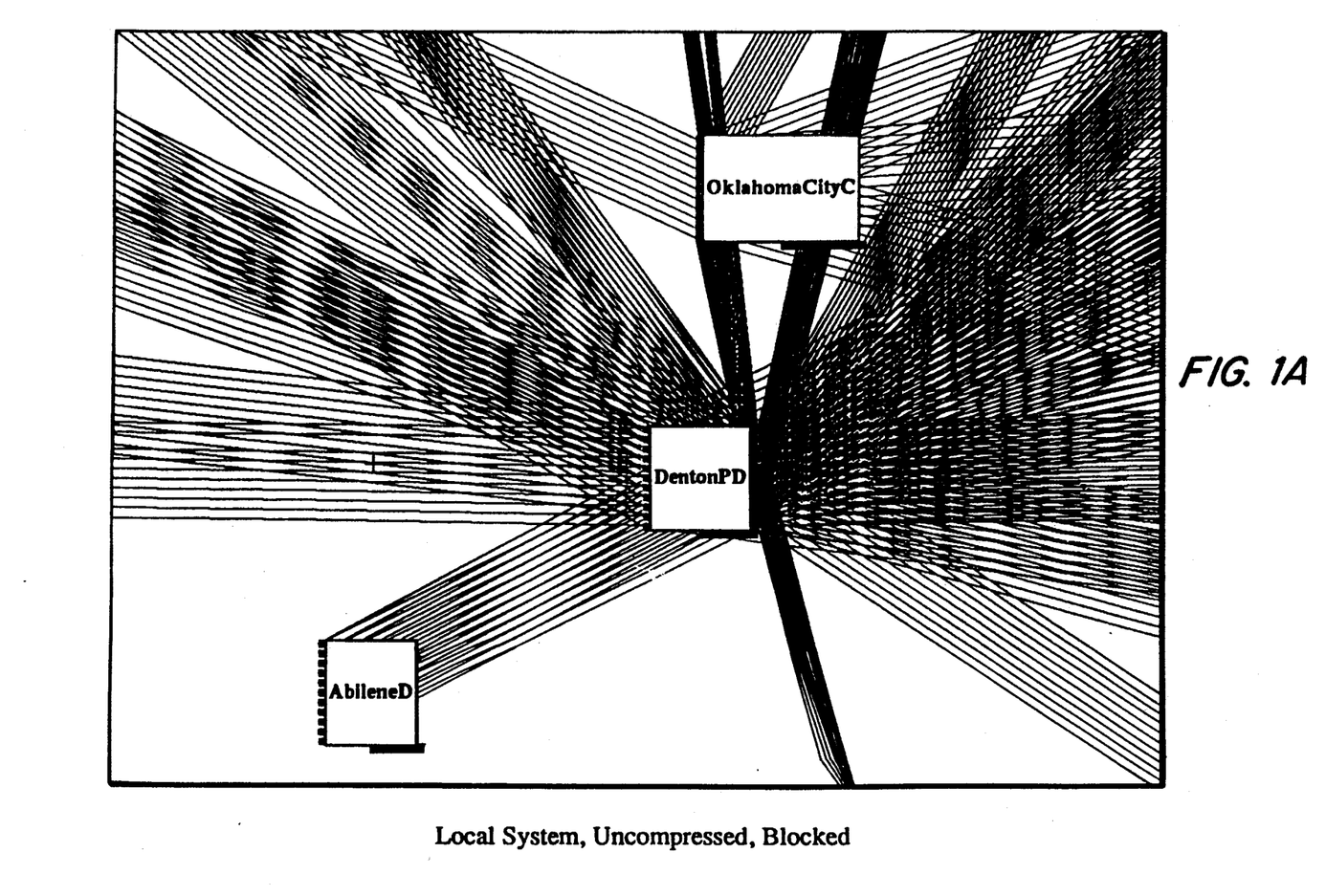
FIG. 1(a) shows a display of the flow processes subset of FIG. 1 after blocking or aggregating the nodes.
Figure 1B:
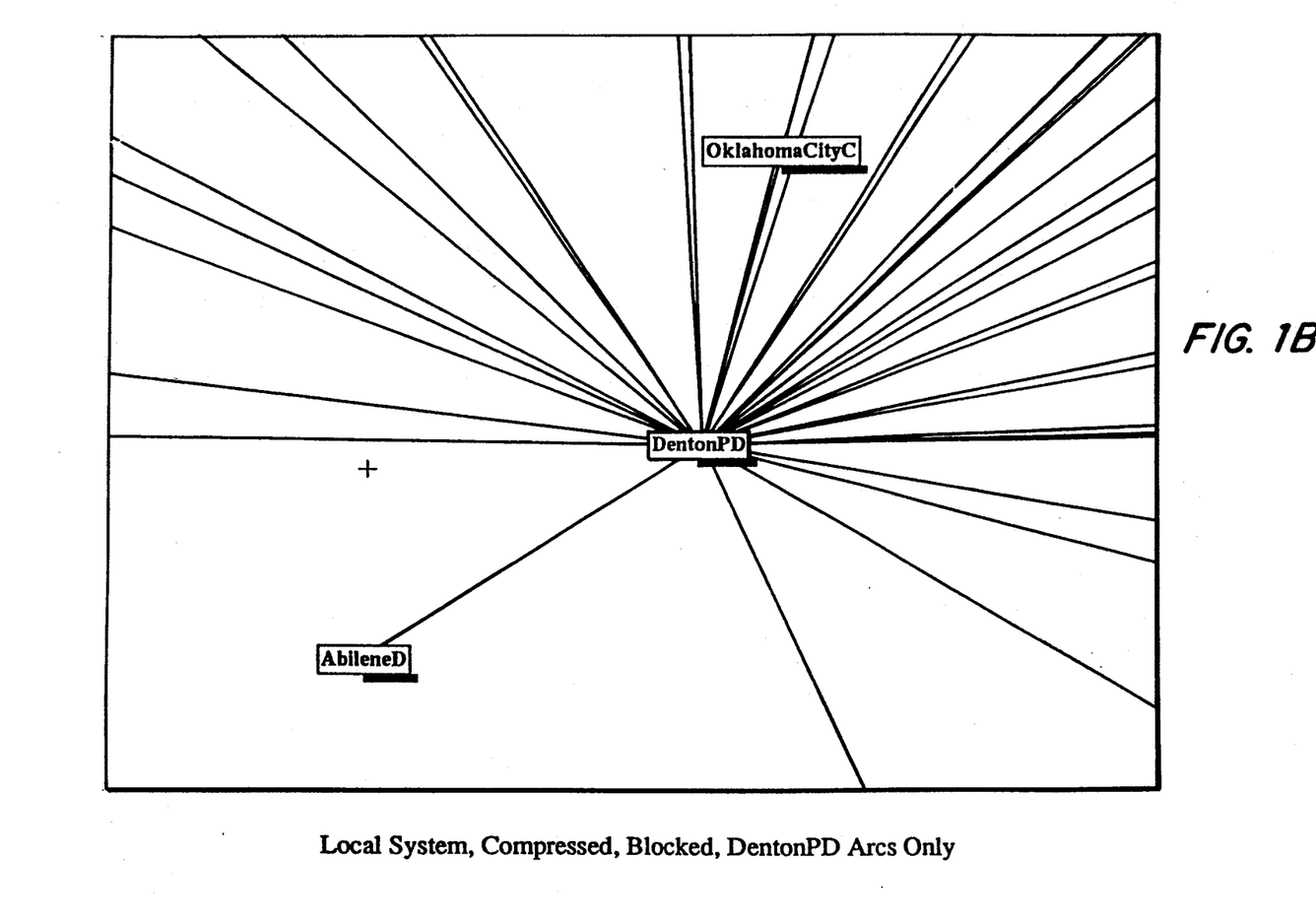
FIG. 1(b) shows a display of the flow processes subset of FIG. 1 after blocking and compressing the arcs.
Figure 2:
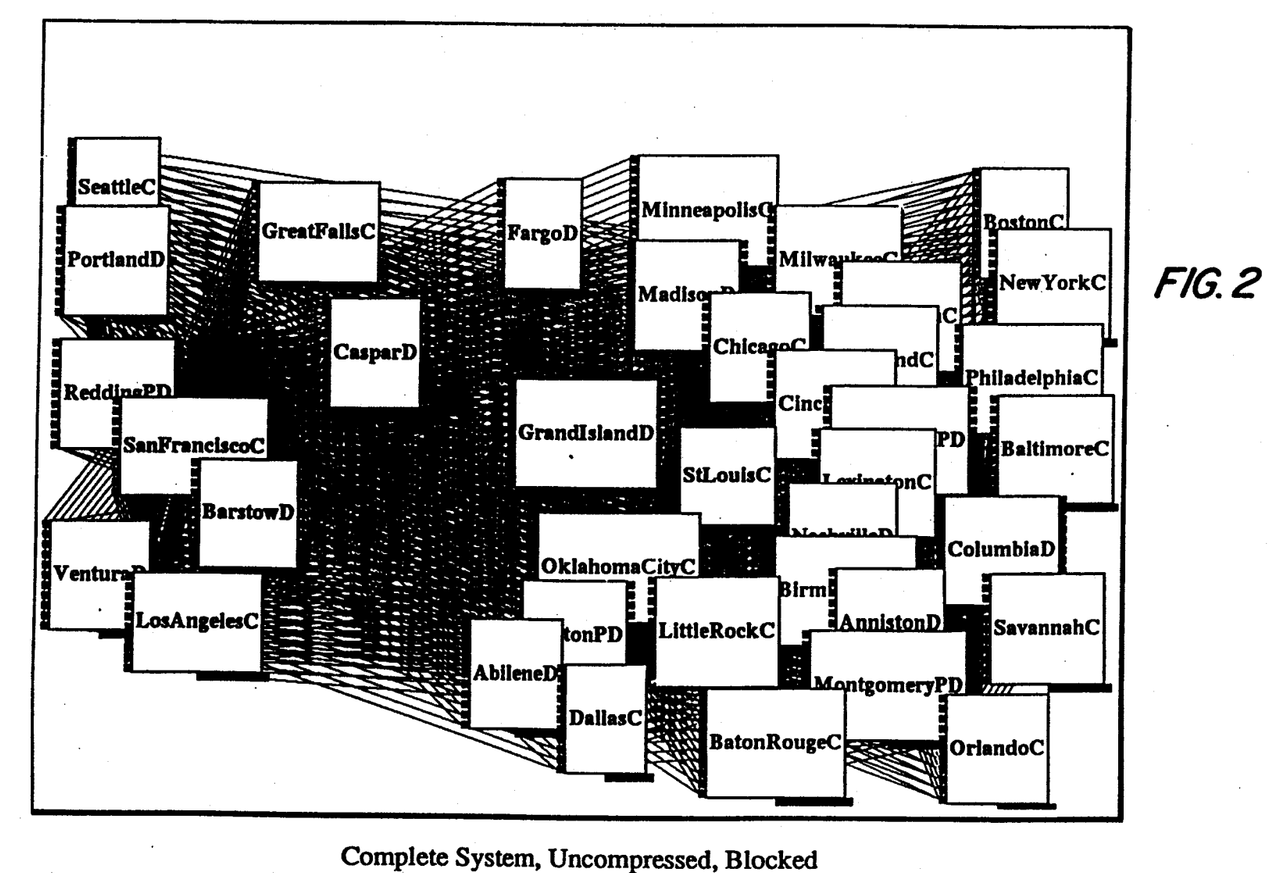
FIG. 2 shows a display of a flow processes complete system after blocking.
Figure 2A:
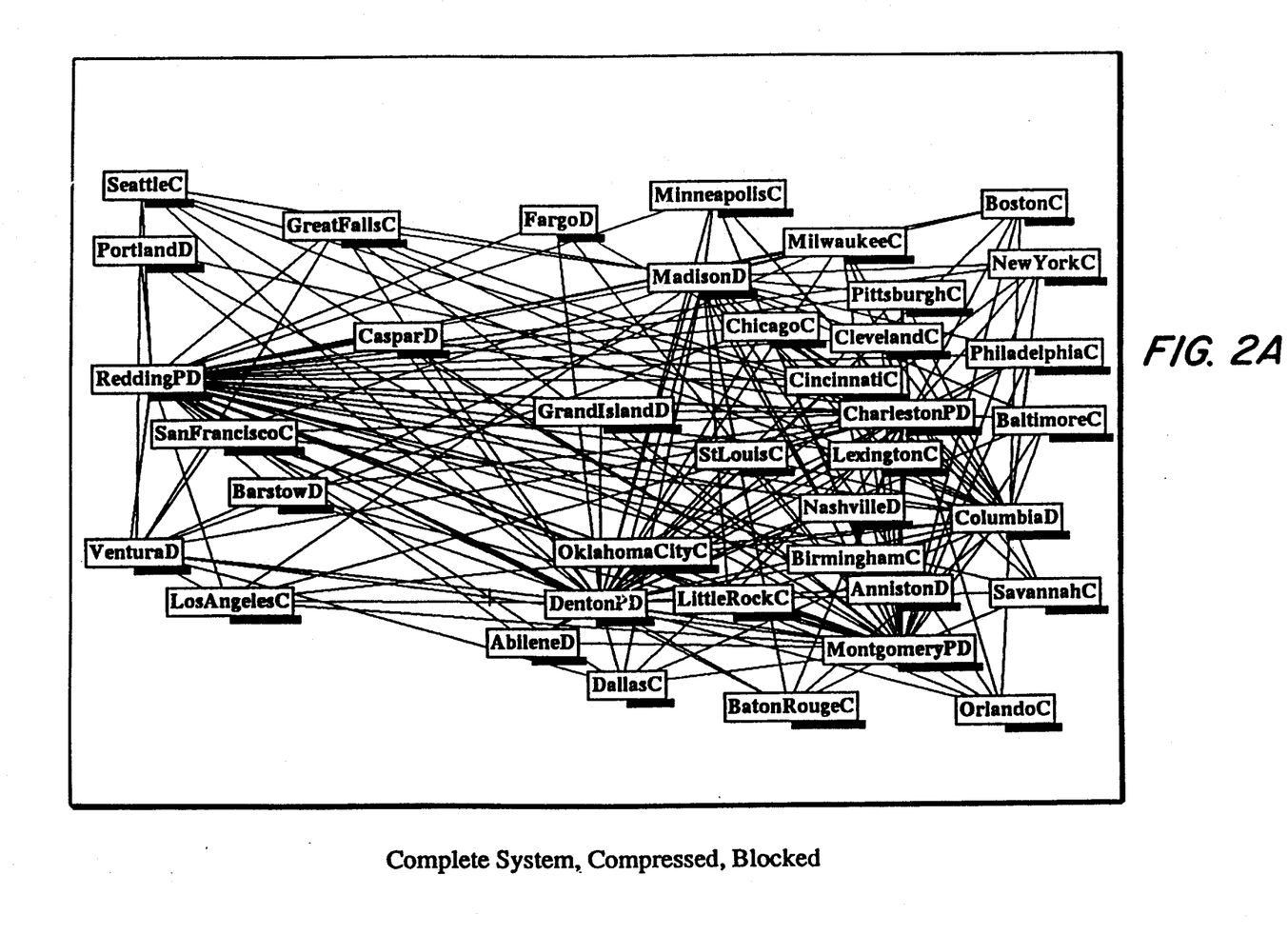
FIG. 2(a) shows a display of the flow processes complete system of FIG. 2 after blocking and compressing.

After collecting and usually, but not necessarily, after loading the relevant data into the database, the operator decides what nodes to "block" or aggregate in a logical view to reduce the complexity display, as in FIG. 1a. Blocking also allows the operator to designate this block node as a "single source" if desirable. Single source means that only one path for supplying that node will be utilized in the prospective plan. Also arcs can be "Compressed" which represents the arcs or commodity flows as a single arc between block nodes, such as in FIG. 1b. Blocking of the system can be incorporated into the database and a complete system such as in FIG. 2 would be displayed. Compressing arcs also can be incororated into the data base and would result in a complete system display as in FIG. 2a.

The operator then proceeds to prepare a plan by designating the solver to solve, "Unconstrained" or "single sourced". "Unconstrained" means that all available arcs or paths can be i.e. employed recognizing all other constraints.

Figure 3:
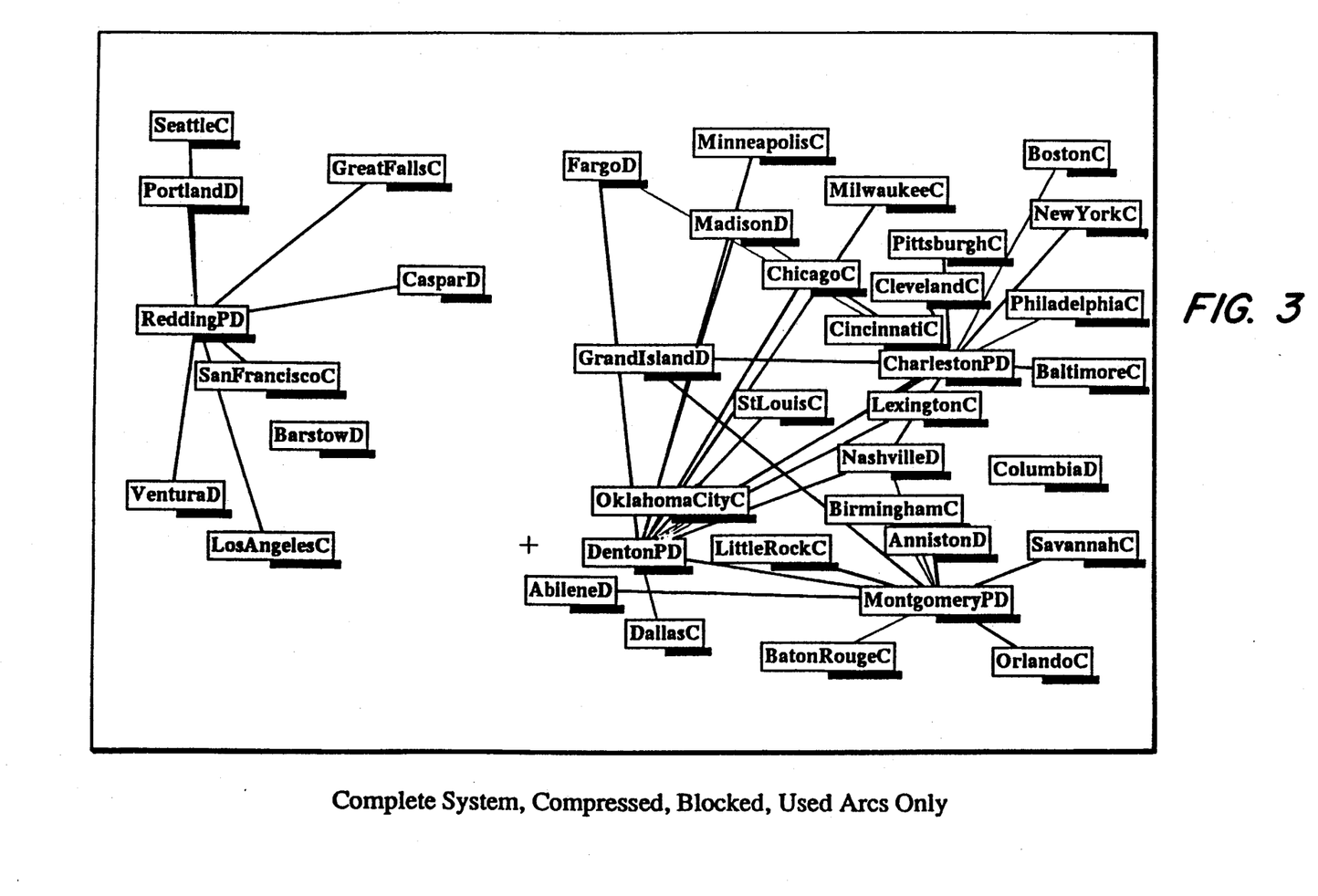
FIG. 3 shows a display of the prospective plan for the flow processes complete system with the arcs and nodes employed.
Figure 4:
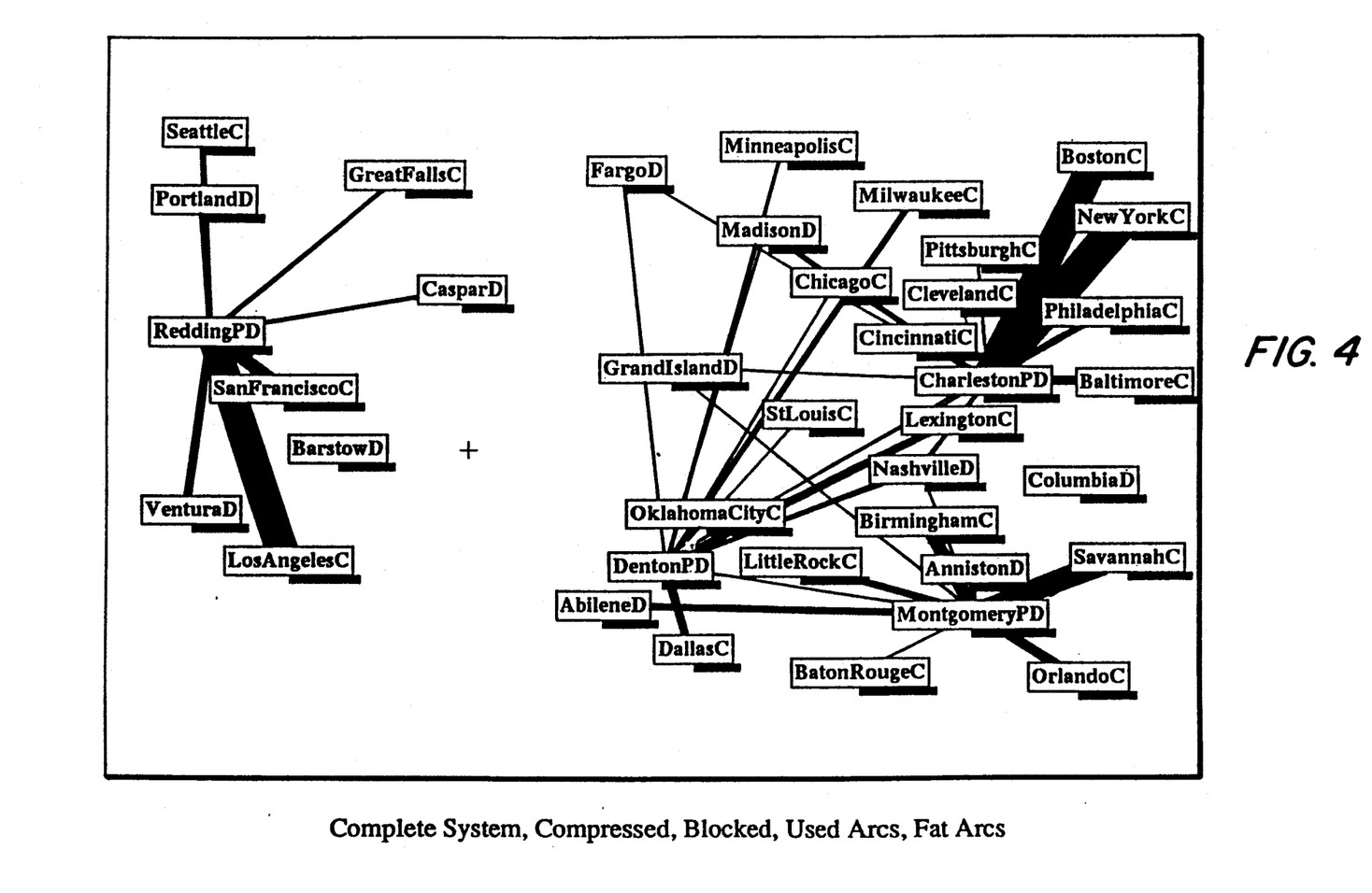
FIG. 4 shows a display of the flow processes complete system of FIG. 3 with arcs wherein the widths of the arcs are portional to the flow.
Figure 5:
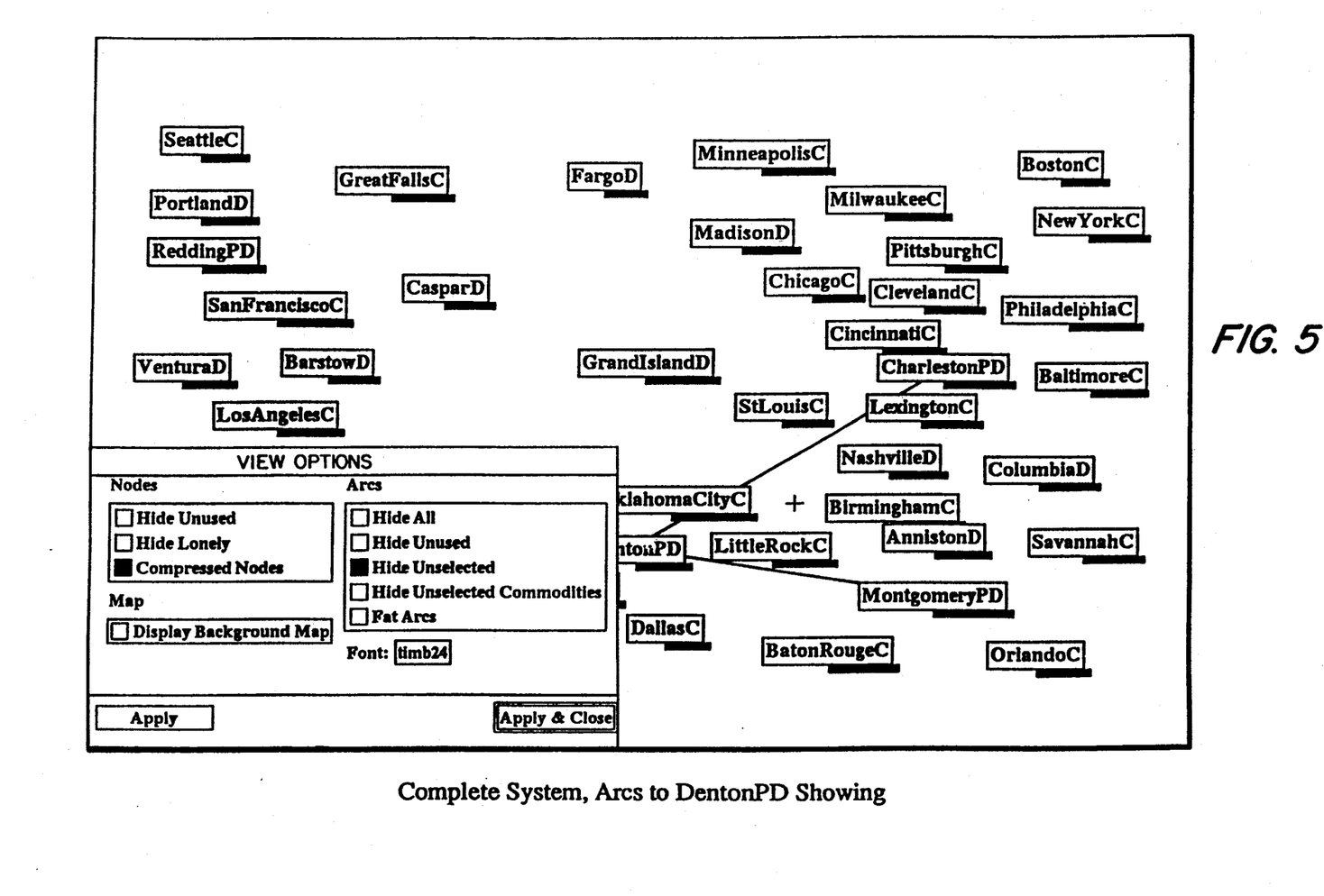
FIG. 5 shows a display of the prospective plan for the flow processes complete system of those arcs and nodes at capacity.

On the display, the plan or solution has the same display as the input probe display. To visualize the solution, various indicators can be employed. FIG. 3 shows the arcs and nodes employed in the solution. In FIG. 4, the width of the arcs or paths is proportional to the flow on a respective arc thus providing a "fat arc", and a display of the prospective plan with the arcs and nodes employed is shown.

Important information is those nodes and arcs that are at capacity. Display for these nodes and arcs at capacity can be invoked and displayed as in FIG. 5. The operator as part of the evaluation of the prospective plan, may want to perform "what-if analysis" on the saturated resources at capacity to provide contingency plans.

Figure 7:
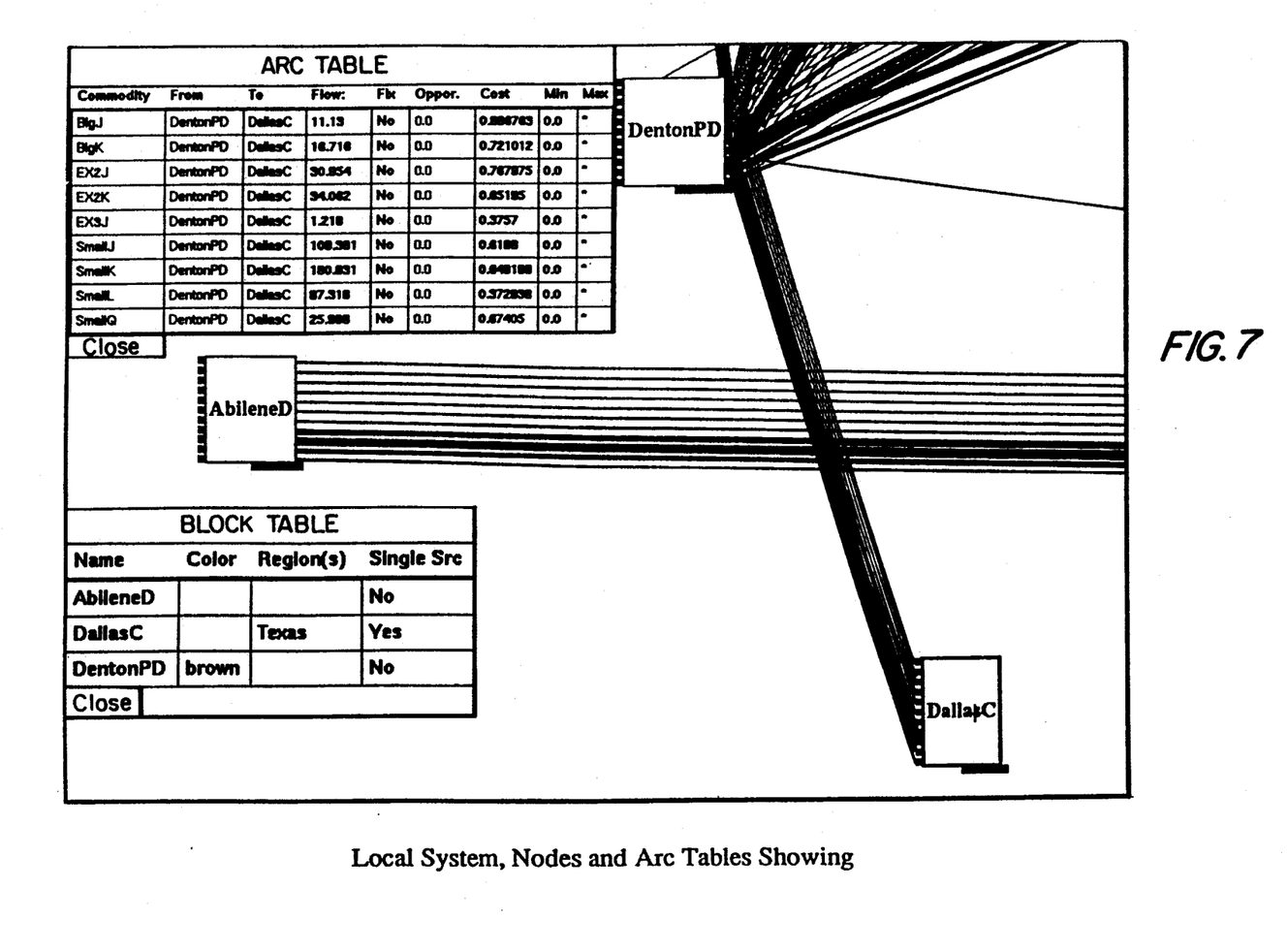
FIG. 7 shows a display of the prospective plans with a window containing information about nodes and arcs in tabular form.
Figure 8:
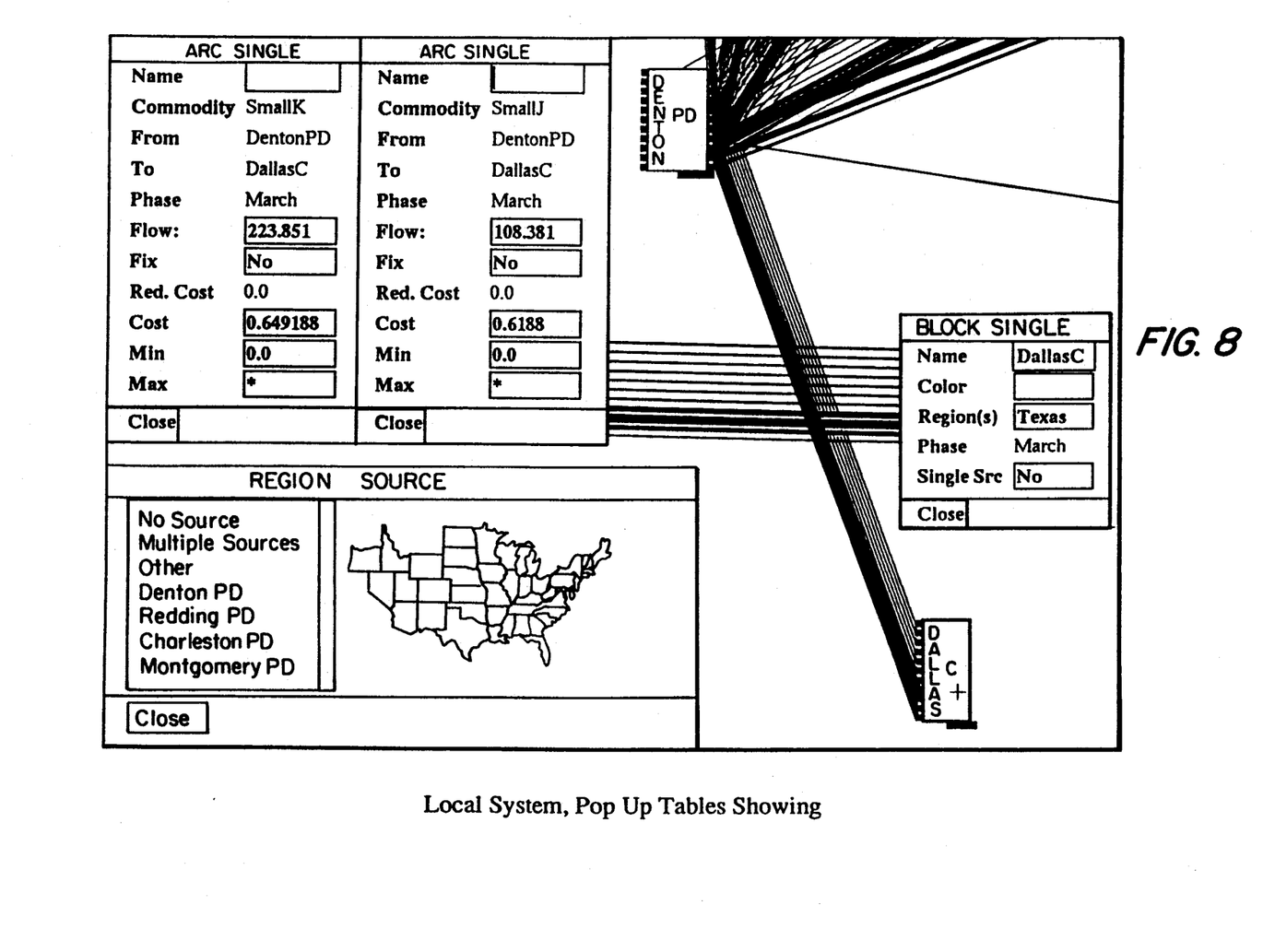
FIG. 8 shows some of the same information as FIG. 7 but containing information in pop-up form.

This can be readily done by querying the database on these selected nodes and arcs and then, having them displayed as a window(s) in tabular format, such as in FIG. 7, or as in FIG. 8, in pop-up form. Various variables and constraints could be changed, such as increasing the availability to a source. Demand could be changed or supply limited; a whole series of "what-ifs" could be created. After each scenario, the arcs and nodes that changed could be displayed and information relating to these contingent situations displayed in pop-up windows.

Figure 6:
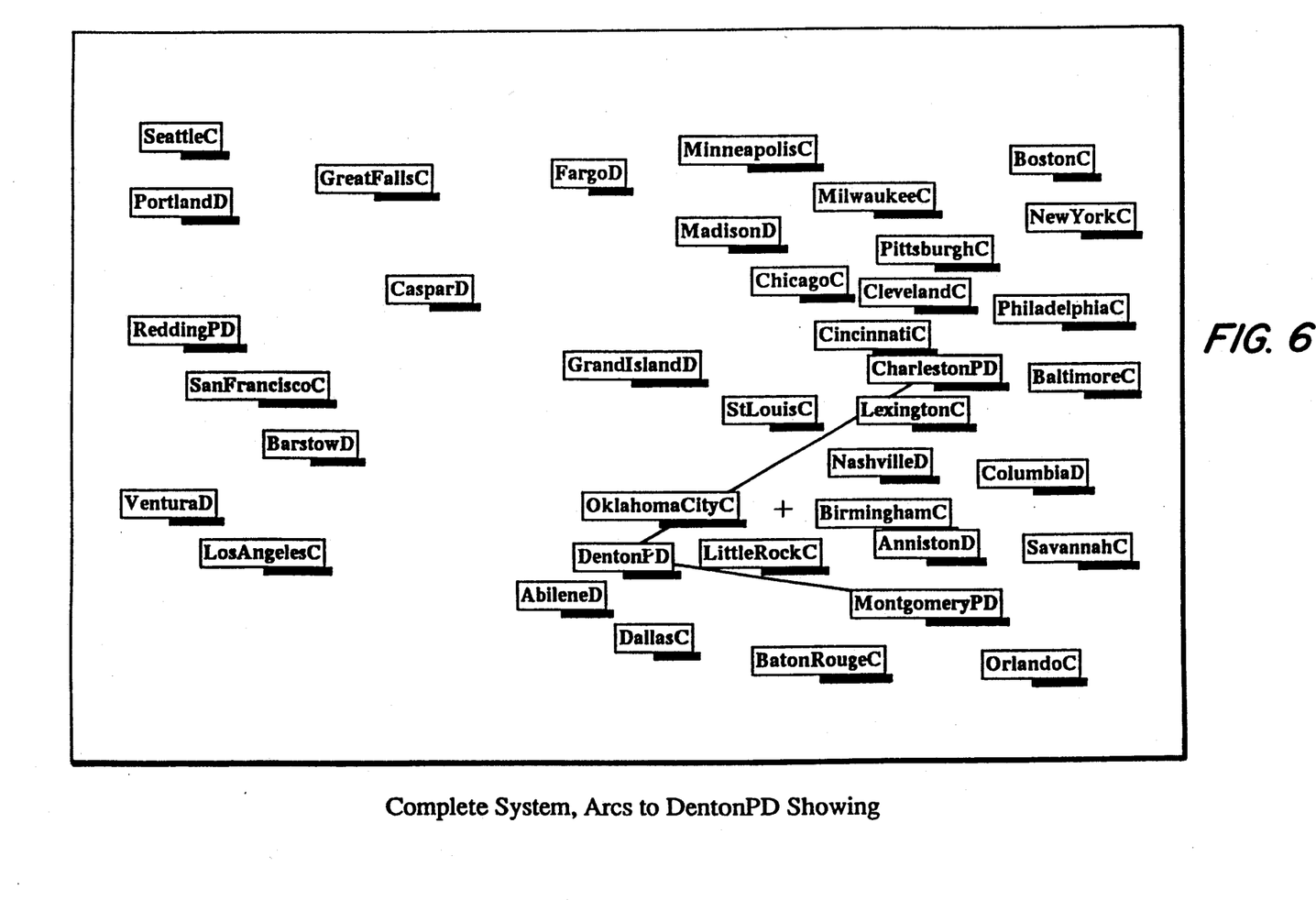
FIG. 6 shows a selected node with the arcs to the node employed in the prospective plan of FIG. 5.
Figure 6A:
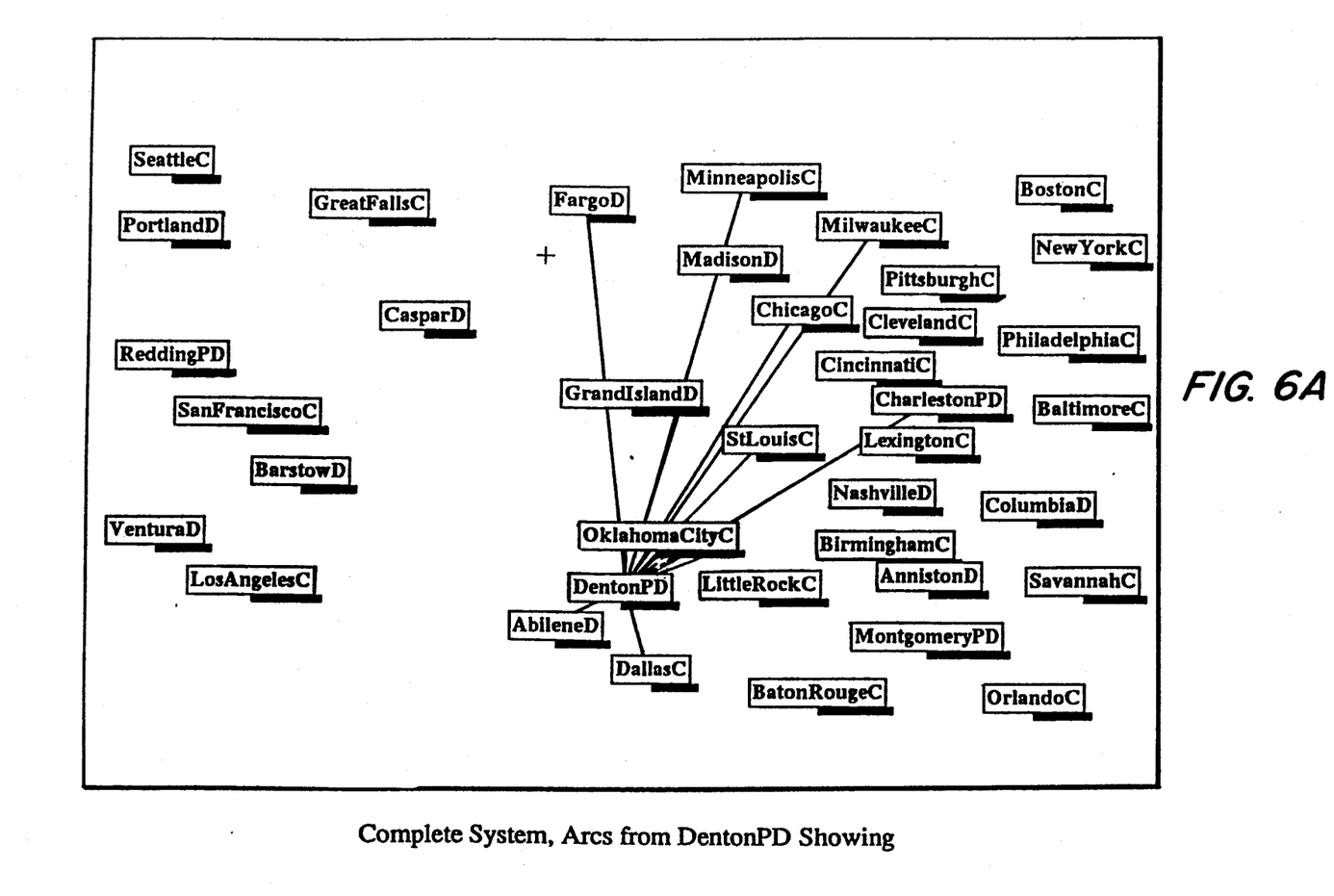
FIG. 6(a) shows a selected node with the arcs from the node employed in the prospective plan.

Similarly, a display of the prospective plan of those arcs and nodes below minimum can be created and information also displayed as previously described. The invention also has the ability to focus on a blocked node as shown in FIG. 6 and 6a, or a single node, and to display the underlying nodes, as shown in FIG. 1a, or the invention can create user defined sets of nodes. This can be performed by invoking the sets functions and creating the set of nodes and/or arcs. This set can be displayed by clicking on the user defined views with the mouse and selecting the appropriate view.

Frequently, it is important that the prospective plan be reported via hard, copy e.g. paper printout in various formats, unique to each organization's requirements. The reports in a manufacturing/distribution environment would likely contain information about demand, quantity produced and shipped. Inventory levels, sourcing requirements, utilization of resources, costs and other information concomitant with the effective management of flow processes.

As discussed previously, the method and system, would most advantageously employ the use of a mouse and windows. The invention also anticipates a system where these capabilities are not available. In such situations, the invention may be also menu driven and a keyboard employed. The nature of the menus and sub-menus, the information to which they permit access, and the other functions they make available will vary depending upon the application. Some menus could only be used to call up information from the database. Other menus to change the display. How such menus could be used are as varied as to the applications to which the invention may be applied.

In the course of interfacing the plan with other modules, information about the planned solution is transferred to them or acquired from a common database by these modules. Likewise, the output of the modules, such as production scheduling, inventory deployment and material sourcing may be monitored against the plan and deviations against predetermined levels are displayed and highlighted and variance indicia can be employed.

It is not unusual for the actual execution to result in differences from the plan. For example, actual demand was not as forecasted, production was not as planned, and inventory was not deployed as had been expected. These actuals could also be part of the database and compared to the plan.

Although it is anticipated that for applications of the instant invention, data entry will normally be through routines importing data from other sources and also through keyboards, computer pens, and/or voice data entry means, it should be understood that the invention is not limited to the use of those devices. Depending on the particular application; radio, laser, microwave, infrared and other devices and methods of transmitting data could be employed.

While a cathode ray tube is most suitable for use in practicing the instant invention, the term "display" has been used herein much more generally, Depending upon the application, hard copy, e.g. paper printout, might be more acceptable. Other more or less sophisticated displays could also be employed.

Finally, the above described embodiments of the invention are intended to illustrate only. Alternative embodiments may be conceived by those skilled in the art without departing from the spirit and the scope for the following claims.

What is claimed is:

1. A method of prospectively planning for and dynamically managing a multiplicity of related processes, resources and commodity flows for a single time period, using a computer having memory, including the steps of:
   a. identifying the processes, resources, and commodity flows for a single time period;
   b. creating a database of information about said processes, resources, and commodity flows;
   c. establishing flow relationships between at least some of the resources, commodity flows and processes;
   d. prospectively planning the utilization of at least some of the resources, processes and the flow of commodities employing a solver; and
   e. displaying, in graphical fashion, the components of the processes, resources and commodity flows as nodes and arcs to be managed spatially.

2. The method of claim 1 wherein said display is a transient optical display and wherein only the arcs and nodes utilized are displayed.

3. The method of claim 1 further comprising the step of displaying arcs and nodes at capacity.

4. The method of claim 1 wherein the widths of the arcs are proportional to flows on the arcs.

5. The method of claim 1 wherein one of the nodes graphically displayed is selected and only the paths used to the selected node are displayed.

6. The method in claim 1 wherein only the paths or arcs from the node used are displayed.

7. The method of claim 1 wherein one of the nodes graphically displayed is selected and all paths to the selected node are displayed.

8. The method of claim 1 further comprising the step of selecting one of the nodes graphically displayed and displaying all paths from the selected node.

9. A method for prospectively planning objects representing related processes, resources and commodity flows for multiple time periods, using a computer having memory, the method including the steps of:
   a. identifying the processes, resources and commodity flows for multiple time periods;
   b. establishing flow relationships between at least some of the commodity flows, resources and processes;
   c. creating a data base of information about processes, resources, and commodity flows;
   d. prospectively planning the utilizations of resources and the flow of commodities employing a solver; and
   e. displaying, in graphical fashion, the objects representing the processes, resources and commodity flows employing first graphic indicia representing at least one of processes and resources and second graphic indicia extending between first graphic indicia representing commodity flows between at least one of processes and resources.

10. The method in claim 1 wherein the solver is at least one of a linear program and a rule-based program.

11. A system for prospectively planning related processes, resources and commodity flows, comprising:
   a. a computer having memory;
   b. a database stored in said memory, said database containing information about processes, resources and commodity flows;
   c. means for prospectively planning the processes, resources, and commodity flows; and
   d. means for displaying the prospectively planned processes, resources, and commodity flows employing first graphic indicia representing at least one of processes and resources and second graphic indicia extending between first graphic indicia representing commodity flows between at least one of processes and resources.

12. The method of claim 9 wherein the solver is at least one of a linear program and a rule-based program.

13. The method of claim 9 wherein the identified processes, resources and commodity flows are represented as objects in the database.

14. The method of claim 1 wherein the identified processes, resources and commodity flows are represented as objects in the database.

15. The system of claim 11 wherein said display means are characterized by being transient.

16. The system of claim 11 wherein at least some of said planning information is made to appear as textual within said display means.

17. A system for prospectively planning, periodic monitoring and managing a plurality of processes, resources and commodity flows, at least some of which are interdependent, comprising:
 a. a computer having memory,
 b. a database stored in said memory containing information about said processes, resources and commodity flows,
 c. planning means for prospectively planning,
 d. display means for displaying in graphical form said processes, resources and commodity flows,
 e. means for communicating at least some of said prospectively planned information through use of graphically displayed indicia; and
 f. means for comparing at least one of said prospective plans with at least another prospective plan or with information in said database to display differences.

18. The system of claim 11 wherein said data base comprises a semi-permanent data base and a transitory data base.

19. The system of claim 11 further comprising means for interrogating said data base to cause a display of information about one of said processes, resources or commodity flows.

20. The system of claim 11 wherein the database contains information in the form of maps, diagrams and layouts for portraying spatial relationships between various resources, processes and commodity flows.

21. The method of claim 1 wherein the components of the processes, resources and commodity flows are displayed as at least one of the aggregate of the input and output, as blocked node sets, as compressed arcs, and as portions thereof.

22. The method of claim 1 further including blocking certain nodes and compressing certain arcs.

23. The method of claim 1 further including using various indicia to provide visual identification of symbols as well as information about the solution, capacity, minimum levels, flows and variances.

24. A method as defined in claim 9, wherein at least one of the objects is displayed in a graphical fashion selected from the group including a blocked node, a single arc, and an arc in which the width of the arc is proportional to the flow.

25. A method as defined in claim 9, wherein at least one of the objects is displayed in aggregate form.

26. A method for prospectively planning for and managing a multiplicity of related processes, resources and commodity flows, using a computer having memory, comprising the following steps:
 identifying related processes, resources and commodity flows;
 generating a database of information about the identified related processes, resources and commodity flows;
 establishing at least one flow relationship between the identified related processes, resources and commodity flows;
 planning the utilization of at least one of the identified processes, resources and commodity flows; and
 graphically displaying components of the prospectively planned processes, resources, and commodity flows by employing graphic indicia representing processes and resources and lines extending between graphic indicia representing commodity flows between at least one of processes and resources.

27. A method as defined in claim 26, wherein the graphic indicia are nodes and the lines are arcs located between nodes.

28. A method as defined in claim 27, wherein the nodes and arcs are managed at least one of spatially and temporally.

29. A method as defined in claim 26, wherein a solver is employed to plan the utilization of at least one of the identified processes, resources and commodity flows.

30. A method as defined in claim 26, wherein the related processes, resources and commodity flows are identified for a plurality of time periods.

31. A method as defined in claim 26, wherein the graphic indicia and lines are selected from the group including a node, an arc, a blocked node, a compressed arc, and an arc in which the width of the arc is proportional to the flow on the arc.

32. A method as defined in claim 26, wherein at least one of the components of the related processes, resources and commodity flows is displayed in aggregate form.

33. A method for at least one of planning and managing a multiplicity of related processes, resources and commodity flows, using a computer having memory, comprising the following steps:
 generating a database containing information about the related processes, resources, and commodity flows;
 establishing at least one flow relationship between the related processes, resources and commodity flows;
 planning and utilization of at least one of the processes, resources and commodity flows; and
 graphically displaying the processes, resources, and commodity flows employing first graphic indicia representing processes and resources, and second graphic indicia extending between first graphic indicia representing commodity flows between at least one of processes and resources.

34. A method as defined in claim 33, wherein the first graphic indicia are in the form of nodes and the second graphic indicia are in the form of arcs.

35. A method as defined in claim 34, further comprising the step of aggregating a plurality of nodes into at least one blocked node to reduce the complexity of the display.

36. A method as defined in claim 35, further comprising the step of compressing a plurality of arcs coupled to a blocked node into a compressed arc.

37. A method as defined in claim 33, further comprising the step of planning the utilization of at least one of the identified processes, resources and commodity flows employing a solver.

38. A method as defined in claim 35, further comprising the step of unblocking a blocked node to reveal the underlying nodes.

39. A method as defined in claim 33, further comprising the step of interrogating the database to cause a display of information about at least one of the processes, resources and commodity flows.

* * * * *

REEXAMINATION CERTIFICATE (3521th)

United States Patent [19]

Sitarski

[11] B1 5,237,497

[45] Certificate Issued  May 26, 1998

[54] METHOD AND SYSTEM FOR PLANNING AND DYNAMICALLY MANAGING FLOW PROCESSES

[75] Inventor: Edward M. Sitarski, Toronto, Canada

[73] Assignee: Numetrix Laboratories Limited, Toronto, Canada

Reexamination Request:
No. 90/003,673, Dec. 28, 1994

Reexamination Certificate for:
Patent No.: 5,237,497
Issued: Aug. 17, 1993
Appl. No.: 673,294
Filed: Mar. 22, 1991

[51] Int. Cl.$^6$ ............................ G06F 17/60; G06G 7/48
[52] U.S. Cl. .................................... 395/208; 395/207
[58] Field of Search ............................ 364/402, 401; 395/140, 155, 161, 159, 201, 207, 208, 326, 348, 962, 965, 969; 379/16, 34, 96, 122, 136, 221, 247

[56] References Cited

U.S. PATENT DOCUMENTS

5,136,690  8/1992  Becker et al. ..................... 395/161

OTHER PUBLICATIONS

Southern Tier 1990 Technical Conference, IEEE Catalog No. 90THO313-7, Telfer, "Effective Project Management with PMCP on Application System (AS)", pp. 131-145.

Powell and Sheffi, "Design and Implmentation of an Interactive Optimization System for Network Design in the Motor Carrier Industry," Operations Research, Jan.-Feb. 1989, vol. 37, No. 1.

Jones, "Application of a Graph–Based Modeling System (GBMS)," paper at the Wharton School, dated Oct. 18, 1988.

Ma, Murphy and Stohr, "A Graphics Interface for Linear Programming" Communications of the ACM, Aug. 1989, vol. 32, No. 8.

Jones, "Graph–Based Models," Ph.D. Thesis at Cornell University, Jan. 1985.

*Primary Examiner*—Robert A. Weinhardt

[57] ABSTRACT

A method for prospective planning and dynamic management of a flow processes comprising a plurality of interrelated and interdependant processes, resources and commodity flows using a computer system. The method includes providing a database containing information about the flow process and graphically displaying both the problem and the solution spatially and/or temporally. Indicia can be made to appear on the display to provide visual identification of symbols as well information about the solution, capacity, minimum levels, flows and variances. In addition, access to the data base can be made available either to update the display to reflect current information or to perform "what-if" scenarios. Access to the database is through objects displayed and permits a wide variety of information to be queried and displayed. The system also has the capability to communicate portions or all of the plan to other modules and to receive data from other modules.

Local System, Compressed, Blocked, DentonPD Arcs Only

B1 5,237,497

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9, 11–13, 15–16, 18–20, 24–25 and 33–39 are cancelled.

Claims 1, 5–8, 17 and 26 are determined to be patentable as amended.

Claims 2–4, 10, 14, 21–23 and 27–32, dependent on an amended claim, are determined to be patentable.

1. A method of prospectively planning for and dynamically managing a multiplicity of related processes, resources and commodity flows for a single time period, using a computer having memory, including the steps of:
   a. identifying the processes, resources, and commodity flows for a single time period;
   b. creating a database of information about said processes, resources, and commodity flows;
   c. establishing flow relationships between at least some of the resources, commodity flows and processes;
   d. prospectively planning the utilization of at least some of the resources, processes and flow of commodities employing a solver; [and]
   e. displaying, in graphical fashion, the components of the processes, resources and commodity flows as nodes and arcs to be managed spatially, *each of said arcs interconnecting a pair of said nodes, each of said arcs having a directional flow from a first node in said pair to a second node in said pair; and*
   f. *selecting one of said nodes and displaying a set of said arcs associated therewith, said set of arcs being selected based upon the directional flow of each of said associated arcs with respect to said selected node.*

5. The method of claim 1 wherein [one of the nodes graphically displayed is selected and] *said set of said arcs consists of* only the [paths used] *utilized arcs flowing* to the selected node [are displayed].

6. The method in claim 1 wherein *said set of said arcs consists of* only the [paths or] *utilized* arcs *flowing* from the selected node [used are displayed].

7. The method of claim 1 wherein [one of the nodes graphically displayed is selected and] *said set of said arcs consists of* all [paths] *arcs flowing* to the selected node [are displayed].

8. The method of claim 1 [further comprising the step of selecting one of the nodes graphically displayed and displaying] *wherein said set of said arcs consists of* all [paths] *arcs flowing* from the selected node.

17. A system for prospectively planning, periodic monitoring and managing a plurality of processes, resources and commodity flows, at least some of which are interdependent, comprising:
   a. a computer having memory,
   b. a database stored in said memory containing information about said processes, resources and commodity flows,
   c. planning means for prospectively planning,
   d. display means for displaying in graphical form said processes, resources and commodity flows,
   e. means for communicating at least some of said prospectively planned information through use of graphically displayed indicia; and
   f. means for comparing at least one of said prospective plans with at least another prospective plan or with *said* information in said database *about said processes, resources and commodity flows* to display differences.

26. A method for prospectively planning for and managing a multiplicity of related processes, resources and commodity flows, using a computer having memory, comprising the following steps:
   identifying related processes, resources and commodity flows;
   generating a database of information about the identified related processes, resources and commodity flows;
   establishing at least one flow relationship between the identified related processes, resources and commodity flows;
   planning the utilization of at least one of the identified processes, resources and commodity flows; [and]
   graphically displaying components of the prospectively planned processes, resources, and commodity flows by employing graphic indicia representing processes and resources, and lines extending between *said* graphic indicia representing commodity flows between at least one of *said* processes and resources, *each of said lines interconnecting a pair of said graphic indicia, each of said lines having a directional flow from a first graphic indicia in said pair to a second graphic indicia in said pair; and*
   *selecting one of said graphic indicia and displaying a set of said lines associated therewith, said set of lines being selected based upon the directional flow of each of said associated lines with respect to said selected graphic indicia and being selected from the group including: only the utilized lines flowing to the selected graphic indicia, only the utilized lines flowing from the selected graphic indicia, all lines flowing to the selected graphic indicia and all lines flowing from the selected graphic indicia.*

\* \* \* \* \*